United States Patent
Tennison et al.

(10) Patent No.: US 6,522,884 B2
(45) Date of Patent: Feb. 18, 2003

(54) SYSTEM AND METHOD FOR DYNAMICALLY ROUTING MESSAGES TRANSMITTED FROM MOBILE PLATFORMS

(75) Inventors: Lynden L. Tennison, Omaha, NE (US); Thomas J. Vaiskunas, Omaha, NE (US); Todd M. Conley, Elkhorn, NE (US); Nader Edeid, Upton, MA (US); Dave J. Wilmes, Omaha, NE (US)

(73) Assignee: Nexterna, Inc., Omaha, NE (US)

( * ) Notice: Subject to any disclaimer, the term of this patent is extended or adjusted under 35 U.S.C. 154(b) by 0 days.

(21) Appl. No.: 09/790,328

(22) Filed: Feb. 21, 2001

(65) Prior Publication Data

US 2002/0046292 A1 Apr. 18, 2002

Related U.S. Application Data

(60) Provisional application No. 60/184,227, filed on Feb. 23, 2000.

(51) Int. Cl.$^7$ .................................................. H04Q 7/20
(52) U.S. Cl. ........................ 455/445; 455/517; 370/351
(58) Field of Search ................................ 455/445, 517, 455/422, 426; 370/351, 352, 356, 255, 400, 428, 355, 357

(56) References Cited

U.S. PATENT DOCUMENTS

| | | | |
|---|---|---|---|
| 5,682,460 A | * 10/1997 | Hyziak et al. | ............ 709/217 |
| 5,761,621 A | 6/1998 | Sainton | ............ 455/453 |
| 5,854,985 A | 12/1998 | Sainton et al. | ............ 455/553 |
| 5,910,951 A | 6/1999 | Pearce et al. | ............ 370/351 |
| 5,959,577 A | 9/1999 | Fan et al. | ............ 342/357.13 |
| 2002/0054587 A1 | * 5/2002 | Baker et al. | ............ 370/352 |

OTHER PUBLICATIONS

International Search Report, PCT/US01/05626, dated Jul. 3, 2001.

* cited by examiner

Primary Examiner—William Trost
Assistant Examiner—Rafael Perez-Gutierrez
(74) Attorney, Agent, or Firm—Jenkens & Gilchrist, P.C.

(57) ABSTRACT

A client device has access to multiple data communications networks when sending a message to a server. An included network management functionality evaluates on an individual message by message basis a number of factors and selects one of the networks over which the message is to be communicated to the server. The selection process involves having the network management functionality identify a particular selection rule containing a network clause relating to each potentially useable communications network. The particular selection data comprising each network clause are then evaluated in the context of the message transmission to select for the message the particular one of the networks to be used for the communication.

12 Claims, 3 Drawing Sheets

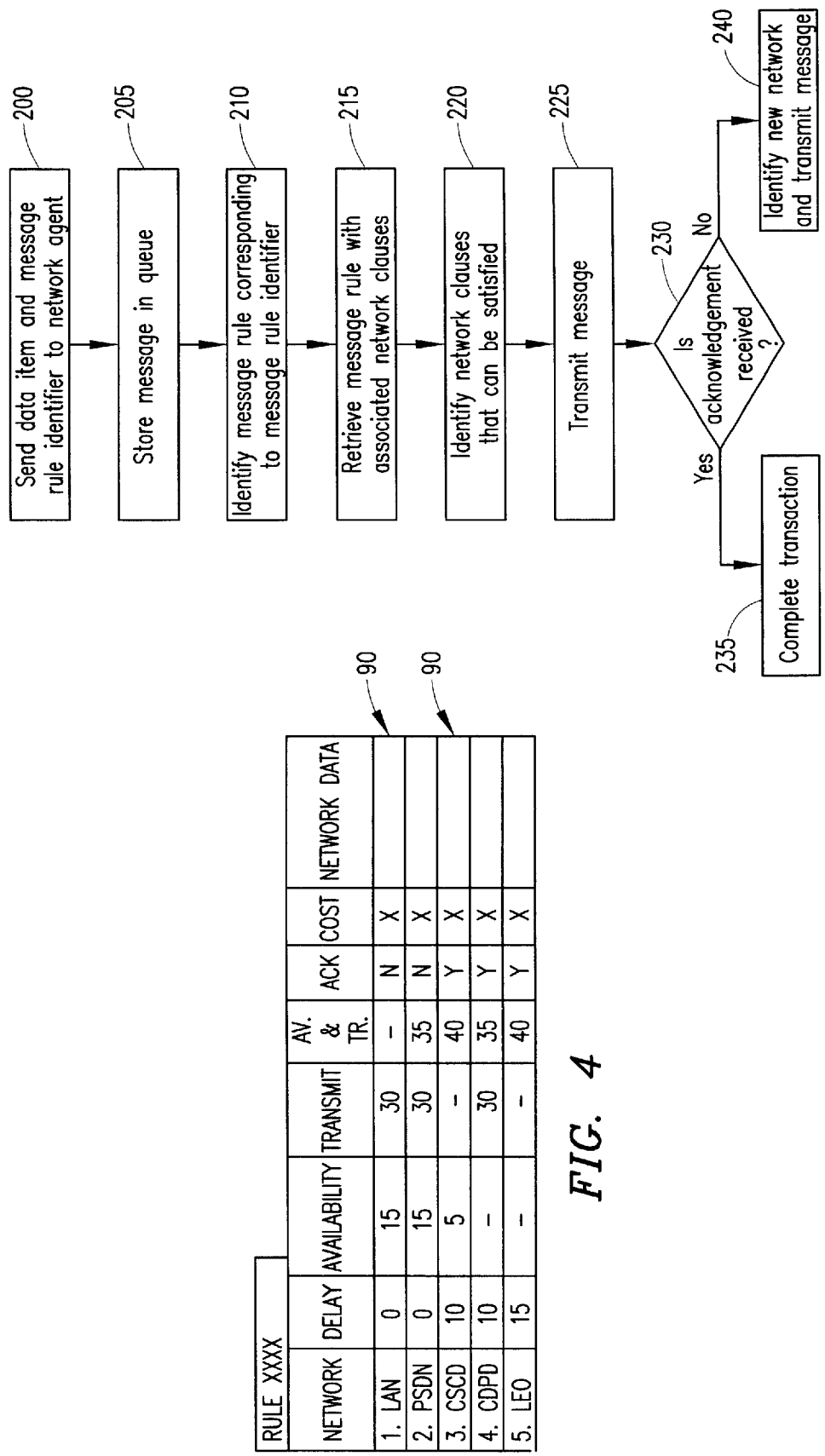

SYSTEM AND METHOD FOR DYNAMICALLY ROUTING MESSAGES TRANSMITTED FROM MOBILE PLATFORMS

RELATED APPLICATIONS

Priority is hereby claimed from Provisional Application No. 60/184,227, filed on Feb. 23, 2000. This provisional application is hereby incorporated by reference.

BACKGROUND OF THE INVENTION

1. Technical Field of the Invention

The present invention relates to mobile data communications and, in particular, to systems and methods for dynamically selecting preferred networks for routing messages.

2. Background of the Problem and Related Art

With the increasing demand for mobile data communications has come a proliferation of sophisticated wireless communication network systems. For example, voice, email, and Internet-related data may be transmitted from a mobile platform via wireless analog cellular, digital cellular or satellite systems in addition to more conventional wired systems (such as a local area or wide area network). The majority of presently available wireless data networks fall into one of four general categories (for example, Wide Area Packet-Switched Data networks; Circuit-Switched Cellular (CSCD) networks; Cellular Digital Packet Data (CDPD) networks; and Satellite networks (LEO, MEO or GEO)) or include industry specific or vendor proprietary network systems. As new technologies emerge and converge, the number, types and availability of wireless data network systems will undoubtedly grow as will the complications encountered in selecting between those systems.

It is recognized by those skilled in the art that no one of the foregoing categories provides an optimum solution for every wireless data application. Performance varies from solution to solution. Factors recognized as influencing the performance of wireless data networks include: geographic coverage, network availability, allowable latency for message delivery, message size, data security, data integrity and the cost of sending the message across the network. Due in large part to the existence of these factors, which all must be taken into some degree of consideration when selecting a network, an evaluation of the wireless data network needs of an organization often returns several competing requirements. In one set of circumstances, a certain wireless data network may be the right choice based on over-riding cost considerations. In other circumstances, message latency, security issues and system availability may dictate the selection of a different wireless data network (even if more expensive).

As a result, an intelligent solution to network selection would preferably use the most desirable wireless data network (taking into account the foregoing factors) with respect to each individual messaging instance. Such a solution effectively eliminates the negative effects which result from the selection of a single "compromise" wireless data network solution to serve the needs of the organization. It would be preferred if the solution effectively evaluated and considered the immediate conditions affecting individual message transmission at the time of message sending and then selected, from amongst the available wireless data networks, the best (i.e., most desirable) network to handle the transmitted message in view of a number of factors or considerations. The present invention provides just such a solution in the form of a mobile resource management tool that effectuates on an individual message by message basis the most effective selection of a supporting wireless data network in relation to a data message transmission.

SUMMARY OF THE INVENTION

A client device has access to multiple data communications networks when sending an application originated message to a server. An included network management functionality evaluates on an individual message by message basis a number of factors and selects one of the networks over which the message is to be communicated to the server. The selection process involves having the network management functionality identify a particular selection rule containing a network clause relating to each potentially useable communications network. The particular selection data comprising each network clause of the identified rule are then evaluated in the context of the message transmission in order to select for the message the particular one of the networks to be used for the communication.

BRIEF DESCRIPTION OF THE DRAWINGS

A more complete understanding of the system and method of the present invention may be had by reference to the following Detailed Description when taken in conjunction with the accompanying drawings wherein:

FIG. 4 is a chart illustrating the format for an exemplary (physical) business rule; and FIG. 5 is a flow diagram illustrating an exemplary method of transmitting data in accordance with the present invention.

DETAILED DESCRIPTION

The present invention is described more fully hereinafter with reference to the accompanying drawings in which preferred embodiments of the invention are shown. This invention, however, may be embodied in many different forms and should not be construed as limited to the embodiments set forth herein. Rather, the described embodiments are provided so that this disclosure is thorough and complete and fully conveys the scope of the invention to those skilled in the art.

Figure 1:
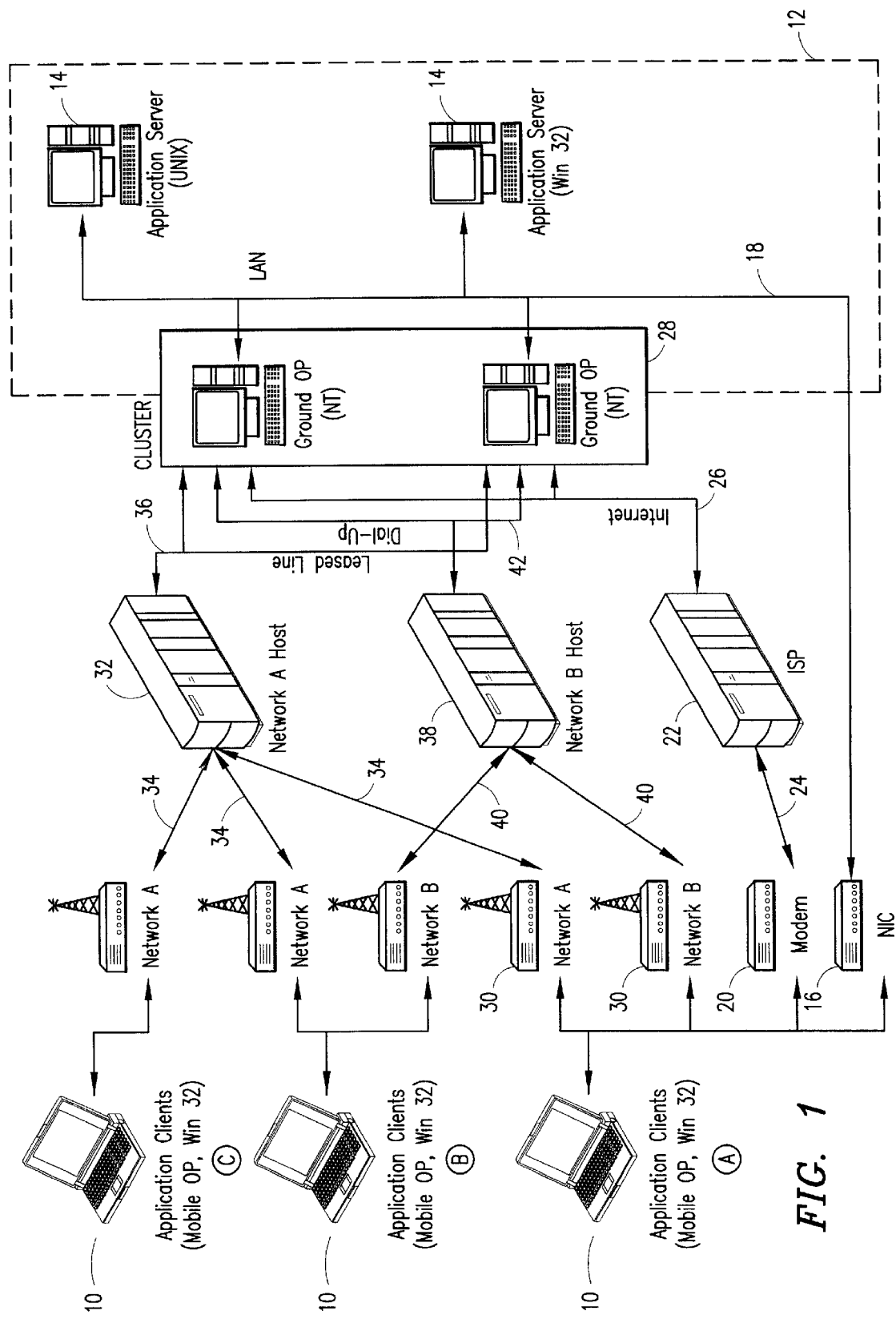
FIG. 1 is a block diagram illustrating an operational environment within which the present invention provides for intelligent wireless data network selection on a message by message basis.

Reference is now made to FIG. 1 wherein there is shown a block diagram illustrating an operational environment within which the present invention provides for intelligent wireless data network selection on a message by message basis. Consider the existence of a plurality of mobile clients (illustrated as laptop computers) 10 belonging to a certain organization 12 and needing to be in communication (both wired and wireless) with an application server (or servers) 14 of the organization. The environment provides a number of means for enabling the mobile clients 10 to gain data communications access to the servers 14. In a wireline context, the mobile client 10 may utilize its network interface card (NIC) 16 to gain access to the servers 14 over a local area network (LAN) 18 provided by the organization.

Also in a wireline context, the mobile client 10 may utilize its modem 20 to access an internet service provider (ISP) 22 over the public switched telephone network 24 and communicate with the servers 14 over the Internet 26 through a cluster 28 acting as an interface between the Internet connection and the local area network 18. In a wireless context, the mobile client 10 may utilize its radio interface 30 to access a first host 32 over a corresponding first wireless data network 34 and communicate with the servers over a leased line connection 36 through the cluster 28 acting as an interface between the leased line connection and the local area network 18. Similarly, the mobile client 10 may utilize its radio interface 30 to access a second host 38 over a corresponding second wireless data network 40 and communicate with the servers over a dial-up connection 42 through the cluster 28 acting as an interface between the dialup connection and the local area network 18.

Each mobile client 10 includes a network management functionality (to be described in greater detail herein) that supports ubiquitous connectivity of the mobile client to the servers (with respect to both wired and wireless data networks). This functionality allows a mobile client to seamlessly roam between wired and wireless networks. Furthermore, the functionality allows the mobile client to seamlessly move in out of the coverage areas of various networks (both wired and wireless). Still further, the functionality allows the mobile client to simultaneously use multiple networks. By this it is meant that multiple applications running on a single mobile client can share access to and use of a single data network for communication with the servers, or alternatively can use different networks at the same time. Additionally, this means that the same application can use multiple networks at the same time for the communication of the same or different messages with the servers.

Consider now the mobile client 10 positioned at location A. At this location, the mobile client has communications access to the local area network, its internet service provider, and the first and second wireless data networks. On a message by message basis, the network management functionality determines which wired and/or wireless data networks should be used to effectuate communications with the servers for that message. That selection operation may take into account a number of factors including: geographic coverage, network availability, allowable latency for message delivery, message size, data security, data integrity and the cost of sending the message across the network. Turning next to the mobile client positioned at location B, more limited data communications access options are available. Here, the mobile client only has access to the first and second wireless data networks. Notwithstanding these access limitations, on a message by message basis, the network management functionality determines which wireless data network(s) should be used to effectuate communications with the servers. That selection operation takes into account the same factors mentioned previously, and may involve choosing to wait until a more favorable network becomes available. Moving on to the mobile client positioned at location C, it appears that only access to the first wireless data network is available. Again, the factors are taken into account in making a determination whether to engage in the data communication with the server over the only available data network, or alternatively delay transmission until a more favorable network becomes available. In each case it may be recognized that the network management functionality effectively evaluates and considers the immediate conditions affecting individual message transmission at the time of message sending and then selects, from amongst the available wired and/or wireless data networks, the best (i.e., most desirable) network to handle the transmitted message. This selection action is made based on a set of programmable rules that allow for consideration of multiple networks in a simultaneous fashion (using a sort of parallel execution/consideration process).

Figure 2:
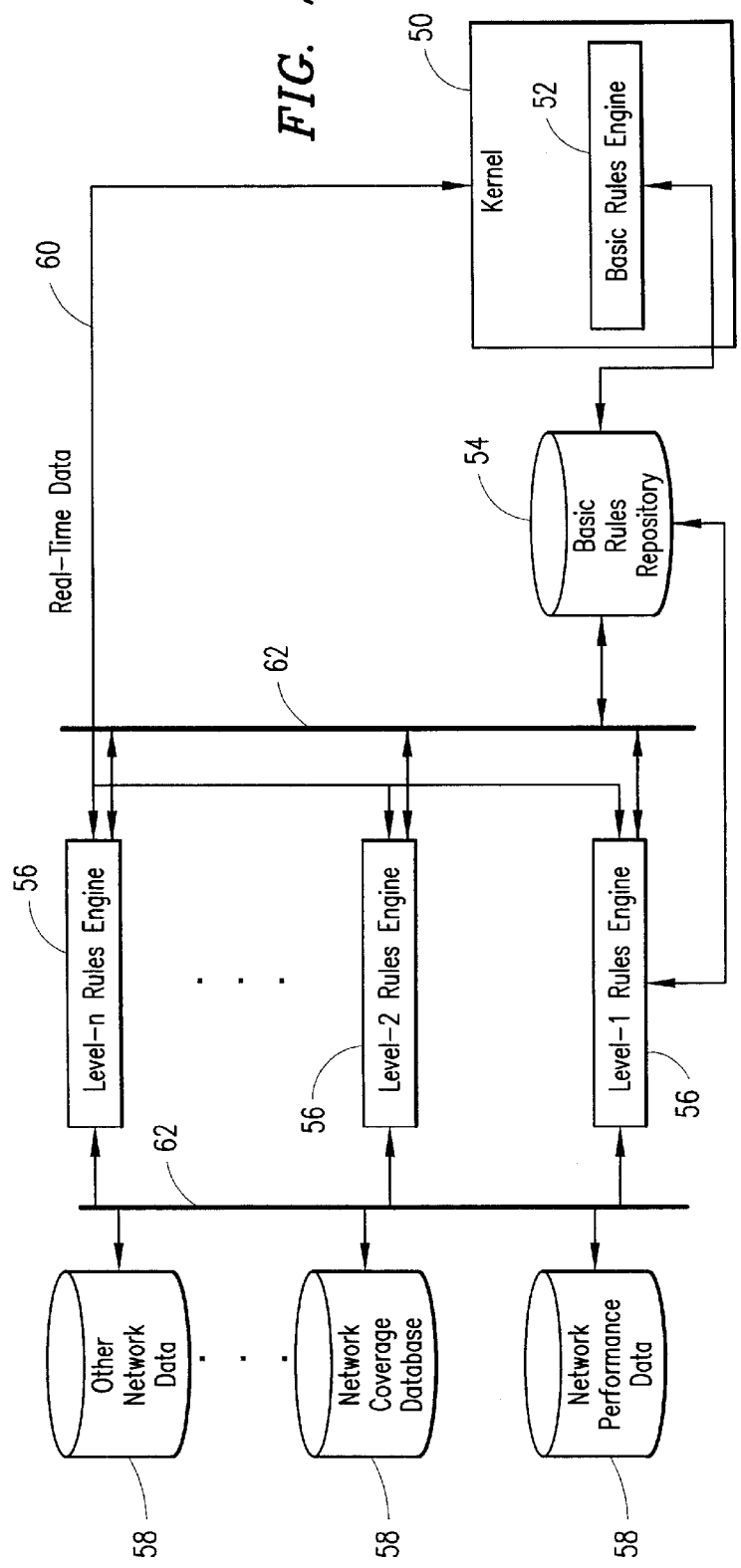
FIG. 2 is a block diagram of the network management functionality of the present invention.

Reference is now made to FIG. 2 wherein there is shown a block diagram of the network management functionality of the present invention. A kernel 50 provides a basic rules engine 52 used to interpret a set of basic rules relating to general operation of the network management functionality and serve as the final, and common, output of all other included rules engines (to be described below) by providing consolidation, aggregation and organization functions. The set of basic rules operated on by the kernel 50 are stored in a database 54. The architecture of the network management functionality allows for the use of multiple, layered, rules engines 56. These engines 56 interpret business rules that are used to intelligently determine the best usage of available wired and wireless data networks. The engines 56 are layered as shown to support varying levels of rules evaluation in which more basic and more concrete (i.e., network specific) rules are evaluated on lower levels and more abstract, network independent rules are evaluated above and on top of (i.e., in addition to) the network specific rules. The business rules employ various business criteria and heuristics (for example, cost, coverage, throughput, security, reliability, and the like) to assist in making the selection as to which available network should be used for each message. The business rules have API access to both historical and real time data (as stored in the database(s) 58 or acquired over link 60) in making their decisions. Each layered rule engine 56 may employ a different representation or algorithm (from a simple look-up table to a complex knowledge based system) in making the network determination. At least one shared bus 62 interconnects the engines 56 in a layered fashion thus allowing the engines to interact with each other and share information during the network determination decision making process (thus allowing both concrete and abstract analysis on the different levels to play a part in the decision making process).

The various functions implemented by the architecture described above are provided as separate, distributed components that communicate with each other through inter-process communications (IPC) that have been abstracted to allow for the use of any suitable, selected component framework (such as, for example, DCOM, CORBA, or RMI). This architecture has a number of unique features including: components are interoperable at the binary level and thus can be swapped or replaced without any effect on other components of the system; the IPC abstraction allows for the usage of different frameworks without requiring any changes in the entities using the IPC; and, the components can be moved across process and machine boundaries without any affect on the other components in the system.

The architecture advantageously separates the communication details for a given network from the kernel and abstracts them into a common API-type network interface agent. This allows for the development of an agent component for each potentially used network. In this environment, the kernel acts as the networking server dealing at the abstracted messaging level. The agents, on the other hand, act as networking clients dealing with the details specific to each network. This allows for the following advantages: new networks may be added for consideration by the network management functionality without affecting the kernel or any of the kernel's clients (like business applications or administrative applications); the platform upon which the network management functionality is implemented may be easily configured by simply adding, removing or swapping agents; special purpose agents may be built for clustering agents under one kernel (for example, a modem bank with an agent for each modem); and, given the nature of the distributed component architecture, agents may be brought on and off line without the need for restarting the entire system.

The architecture provides a common messaging API for its business applications that is network independent. The applications communicate using logical names and addresses. The kernel performs a mapping operation between logical addresses and the specific network address for the device being used. In this context, the API is provided as a toolkit that hides all the IPC details from the application. This architecture accordingly protects the investment made in application development by: allowing for the device configuration to be changed without the need to change the application; and, allowing for the IPC framework to be changed without the need to change the application. In addition, the messaging service used with respect to the API provides for duplicate message elimination, guaranteed delivery, multiple levels of acknowledgment, store and forward operation, and compression and encryption operation.

As mentioned above, the architecture uses a layered approach. This allows the architecture to achieve a level of extensibility. The system is designed around the kernel which provides minimal capabilities that are sufficient for its assigned tasks. All other functionality is layered on top of the kernel. Each included layer has a well defined function that supplements kernel operation. The boundaries between layers are all established with well defined interfaces. This allows for continued evolution and the addition of advanced functionality with minimal impact on existing components. More specifically, the included layers comprise: the kernel, which provides basic messaging and basic rule engines; the IPC interfaces, which provide the mechanism for other components to interact with the kernel; the network services, which provide network specific communications services; the plug-ins, which provide advanced services layered on top of the kernel provided services (such as, for example, mobile-to-mobile communications, automatic fail-over and load balancing); the protocol proxyserver, which comprises pairs of applications that allow existing applications to tunnel their native protocol using a messaging service (like, for example, Winsock or http); and, the advanced interfaces, which provide advanced functionality layered on top of the basic IPC interfaces (such as, for example, session control and synchronous programming).

Figure 3:
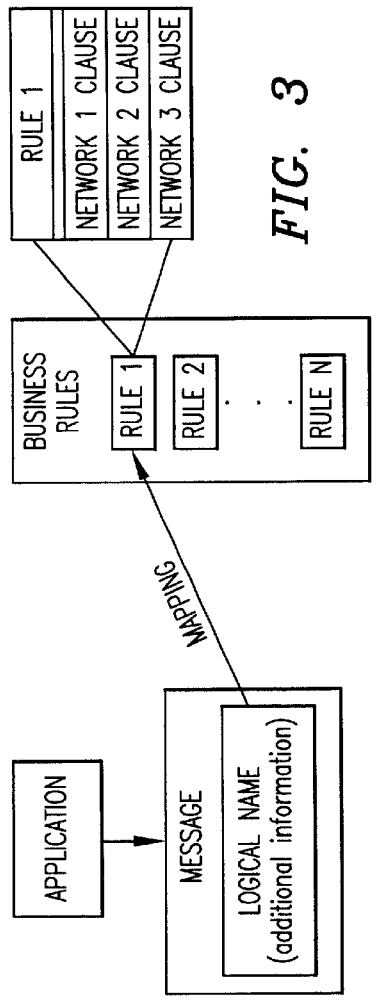
FIG. 3 is a schematic illustration of a rule mapping operation performed by the network management functionality with respect to data network selection.

Reference is now made to FIG. 3 wherein there is shown a schematic illustration of a rule mapping operation performed by the network management functionality with respect to data network selection. A software application executing on a mobile client (10 of FIG. 1) may specify a certain business rule (see, FIG. 2) to be used in determining which data network should be used in transmitting a message. This selection is preferably specified by the application for each individual message to be transmitted, and is then utilized by the network management functionality when making the selection determination. Alternatively, the application may omit the specification of a certain business rule to be used, in which case the network management functionality will determine which business rule is to used based on the evaluation of a set of pre-configured (and stored) defaults.

When a certain business rule is specified, the application does so through the use of a logical name (also referred to as a rules identifier that may additionally include information for consideration in the network selection decision such as priority, message size, cost factors, maximum delivery delay, acknowledgment requirements, geographic sector to which message will be delivered, delivery address, and the like) The network management functionality then operates to map that provided logical name to the identification of a particular business rule. This action is performed by a rules administration function of the network management functionality. If an application uses a logical name that does not have a recognized mapping to a (physical) business rule, the application initiated transmission fails. If, on the other hand, a specific logical name is not included, the rules administration function selects a default (physical) business rule that has been specified for use by the originating application in such cases. In any event, that identified business rule is then extracted and its included network clause(s), to be discussed in more detail below, are applied (in view of the rules identifier supplied additional information) to make the network selection determination.

Reference is now made to FIG. 4 wherein there is shown a chart illustrating the format for a (physical) business rule that is identified by a logical name, extracted as a result of the mapping action and the operated on to make the network selection determination. Each rule includes at least one network clause 90 that identifies the data network for communication and specifies the selection related information to be evaluated in applying the rule to the selection of a certain network. In this context, certain kinds of data may be included in each network clause 90. Although other information could be included in a network clause, in the preferred embodiment the following variable data items are preferably included: delay, availability, transmit, availability and transmit, acknowledgment, cost factor, and network data. Each of these variable data items is described below.

The "delay" variable is the amount of time that the network management functionality waits before considering the selection of that identified data network. No attempt will be made to use the network until this time expires, even if the network is otherwise available. Once the time expires, the network management functionality can attempt to transmit the message on the specified network.

The "availability" variable is the amount of time that the network management functionality waits for the mobile client to come into coverage of the identified data network. Coverage refers to whether the mobile client is within the coverage area (either wired or wireless) of the host. The specified time includes time expended waiting while a network agent (for example, a modem) is busy with other transmission jobs. If the network does not come into coverage, or the agent remains busy, when this time expires, no further attempts will be made to transmit the message over the identified network.

The "transmit" variable is the amount of time within which the message transmission must be completed, assuming that the network has come into coverage and the agent is not busy. If this time expires, no further attempts necessarily need be made to transmit the message over the identified network. Additionally, the transmit variable includes the time to receive an acknowledgment. If the message fails, (due to going out of coverage, transmission errors, or reception errors), attempts will be made to complete the transmission for the duration of the time. If the transmission fails, attempts can be made to transmit on other eligible networks.

The "availability and transmit" variable is the combined total amount of time that can be used for both a network to become available and for the message to be transmitted over that network. The availability and transmit variable can be used to dynamically adjust the transmit time.

The "acknowledgment" variable specifies whether the party receiving the message should return an acknowledgment signal to the transmitting system.

The "cost factor" variable specifies cost factors for the network. The cost factor accounts for message size, geographic location of transmitting/receiving parties, time, and the like. The cost factor can be used to rank multiple networks that would be appropriate for transmitting a message. Alternatively, the cost factor can be used to eliminate a network that would otherwise be appropriate for transmitting the message.

The "network data" variable contains data that is network specific. This data is not necessarily interpreted by the network management functionality in making the network selection decision, but rather is passed on to the network agent for its use when engaging in the transmission.

A more detailed understanding of the operation of the present invention may be obtained from FIG. 5 wherein there is shown a flow diagram illustrating an exemplary method of transmitting data in accordance with the present invention. Although the method of FIG. 5 is described in accordance with a particular sequence of steps, one skilled in the art can recognize that the method of the present invention should not be limited to the described sequence.

The method of the present invention is initiated, by a software application generating a message that is to be transmitted. The message is evaluated by the network management functionality along with transmission criteria (for example, a logical rule identifier along with the rules identifier additional information) and the name of the generating application (step 200). Once received by the network management functionality, the message can be stored in a queue from which it is later retrieved for transmission (step 205). Using the received logical rule identifier, the network management functionality identifies and retrieves the message rule and associated network clause(s) (steps 210 and 215). These network clauses establish the conditions that need to be evaluated by the network management functionality (in view of the rules identifier additional information) and under which each identified network could be selected to transmit the message.

After the rule with its network clause(s) has been retrieved, the network management functionality attempts to identify which, if any, network clause(s) can be satisfied (step 220). By this it is meant that the network management functionality evaluates the individual variable data items identified within the rule in view of the rules identifier additional information to determine whether the specifics of these items can be met. It should further be recognized that each of the individual networks is considered simultaneously (in a parallel-like operation). If none of the network clauses can be satisfied at that time, the message may be stored and attempts made at select intervals to try again to satisfy a clause. When one or more network clauses can be satisfied, however, the network associated with the network clause which is satisfied first is used to transmit the message (step 225). One skilled in the art, however, can understand that various methods (for example, rankings, random selection, and the like) can be used to select one network from two or more appropriate networks whose network clauses have been each been satisfied. It should be understood by those skilled in the art that the physical business rules do not necessarily state absolute conditions upon which a network is selected, but rather that the rule comprises a script that is processed by the network management functionality over a potentially long period of time. This consideration aspect of the process is on-going for a much longer period of time than the time it takes to actually make the selection decision for a certain individual message.

Further, when the application software (or other system) requires that an acknowledgment signal be received, the network management functionality waits a select amount of time for the acknowledgment (step 230). If the acknowledgment is received, the transaction for the message is concluded (step 235). If, however, no acknowledgment is received, the network management functionality may attempt to identify another network over which to send the message (by returning to step 220 and repeating the transmission operation of step 225 over a different network).

A better understanding of the operation of the present invention may be obtained through examination of an exemplary operation. Consider a public utility company that services both urban and rural customers within a hundred mile radius of a metropolitan area. Mobile utility crews receive work orders from and send work order reports back to a central office using portable notebook computers. The notebook computers and the central office are connected by an array of wired and wireless networks. For example, at the office, the notebook computers may be connected to the company's LAN to engage in data communications with the central office server. When out of the office, however, the following wireless network options are available for use in communicating with the central office server:

- a commercial packet-switched data network serving the metropolitan area;
- a cellular network provider for suburban areas and areas along an interstate highway (and also available for use in the metropolitan area); and
- a satellite network provider for rural and remote areas (and also available for use in the metropolitan, suburban and interstate highway areas).

As discussed above, selection of which wireless network to use depends on the specific requirements and preferences of an organization. Coverage area, availability of service, overhead cost, and the direct costs incurred when transmitting data are some of the considerations that need to be evaluated. In the case of the exemplary public utility company, and given the communications options listed above, the following commercial factors are noted:

- commercial packet-switched data network: provides a relatively inexpensive messaging service for small messages, but provides only limited coverage; charges are incurred by the byte and message; and the charge for a short work order report of about 200 bytes equates to approximately $0.10;
- cellular network: wider coverage range, but some outlying areas are outside service or incur additional roaming charges; charges are incurred by the minute, with the minimum charge often being for one minute (which is much less time than actually needed to complete message transmission); and the charge for a short work order report of about 200 bytes is about $0.20 (assuming non-roaming); and
- satellite (LEO) network: advantage of broad coverage area, but very expensive; charges incurred by the byte transmitted; and the charge for a short work order report of about 200 bytes equates to approximately $1.60.

Given the foregoing economic analysis, a (physical) business rule may be defined that includes a network clause for each of these wireless networks with appropriately selected variable data items specified to appropriately drive the selection determination in view of the rules identifier additional information. As an example, the items could be chosen to give preference to: using the packet switched data network whenever available due to the fact that it is relatively inexpensive; using the cellular network when communication is necessary and the added cost per message is justified; and, using the satellite network only in extreme emergency situations. The foregoing is, as understood by those skilled in the art, a greatly simplified example of rules analysis. With the inclusion of many rules identifier supplied pieces of additional information, the analysis becomes much more complex. It should further be recognized that the rule would also include a network clause for the wired LAN network which should be chosen as the primary communications provider whenever available.

Assume now that a utility employee with a mobile client (like a laptop computer) is located at the office and needs to communicate work order related information with the company server. If the laptop is connected to the LAN, when the application issues the message with a work order business logical rule identifier, the physical rule is retrieved and the network clauses of that rule (relating to selection of the LAN, packet network, cellular network and satellite network) are evaluated in order to choose a network form communicating the work order data message. In this case, given a connection with the LAN, the network management functionality analysis and rule evaluation would dictate use of the LAN for the communication. With that selection made, the mobile client would utilize the selected LAN for the message communication.

Now assume that the employee has moved to his vehicle and proceeded to a first job site located within the metropolitan area. Assume further that the mobile client is equipped for communication over each of the available wireless networks (packet, cellular and satellite). Once out in the field, a situation arises wherein a work order related message could be sent to the server. In this situation, when the application issues the message with a work order business logical rule identifier (and rules identifier supplied additional information), the physical rule is retrieved and the network clauses of that rule (relating to selection of the LAN, packet network, cellular network and satellite network) are evaluated in view of the supplied additional information in order to choose a network for communicating the work order data message. In this case, the LAN is not available, but all three wireless connection options are available. The networks are each evaluated in the context of the message to be sent and further in view of the variable data items for each network clause as applied to the rules identifier additional information. The least expensive option (packet data) will not necessarily be chosen, although it is preferred. In some situations, given the contents of the message, the need for security, and other factors (as specified in the rules identifier additional information), the network management functionality may choose to send the message over a more expensive network. Alternatively, it could occur, perhaps if the message has a very low priority or importance, that the network management functionality may choose to wait until the mobile client is returned for a LAN connection to the server.

Finally, assume that vehicle has proceeded to a second job site located away from the metropolitan area. Again, the mobile client is equipped for communication over each of the subscribed to wireless networks (packet, cellular and satellite), but it is noted here that only the satellite network is available for use. A situation then arises wherein a work order related message could be sent to the server. In this situation, when the application issues the message with a work order business logical rule identifier, the physical rule is retrieved and the network clauses of that rule (relating to selection of the LAN, packet network, cellular network, and satellite network) evaluated in view of the rules identifier additional information in order to choose a network for communicating the work order data message. In this case, only the satellite network is available. All networks, however, are evaluated in the context of the message to be sent and further in view of the variable data items for each network clause and the rules identifier additional information. If the message is deemed to be of high, or emergency, importance, the expensive satellite option may be chosen, even though it is necessarily preferred. Alternatively, given a different message importance, the network management functionality may instead choose to wait until the mobile client is returned for data network connection to the server utilizing the packet data network or LAN.

Although a preferred embodiment of the system and method of the present invention has been illustrated in the accompanying Drawings and described in the foregoing Detailed Description, it is understood that the invention is not limited to the embodiment disclosed, but is capable of numerous rearrangements, modifications and substitutions without departing from the spirit of the invention as set forth and defined by the following claims.

What is claimed is:

1. A communications system, comprising:
    a mobile client, the mobile client including hardware for supporting the transmission of mobile client data messages over a plurality of wired/wireless data networks, the mobile client executing a number of software applications, wherein each software application has a need to communicate remotely from the mobile client, the mobile client further operating responsive to receipt of a software application originated data message including a software application specified rule governing transmission of that message to:
    identify from the specified rule a certain one of a plurality of predetermined business rules, each one of the plurality of predetermined business rules being associated with a plurality of network clauses wherein each network clause is associated with one of the plurality of transmission networks and defines criteria for selecting that transmission network for data message communication;
    evaluate the criteria for each network clause associated with the identified certain predetermined business rule to identify one network clause whose criteria is satisfiable in the context of data message transmission; and
    initiate transmission of the received data message over the transmission network that is associated with the identified network clause whose criteria is satisfied.

2. The system of claim 1, wherein the data message includes the specified rule and also network selection information for that data message, and wherein the mobile client operation to evaluate comprises operations to:
    evaluate the criteria of each network clause against the message network selection information to identify the network clause whose criteria can be met by the network selection information for the data message.

3. The system of claim 1, wherein the mobile client operation to identify comprises operations to:

receive with the message a logical name of a rule to be applied to the network selection for that data message; and map the logical name to a physical business rule.

4. The system of claim 1, further comprising mobile client operations to:

store the received data message; and delay initiating transmission of the message pending selection of the transmission network.

5. The system of claim 1 wherein the plurality of wired/wireless networks include:

a wired network comprising a PSTN/Internet network; and a wireless network comprising a cellular data communications network.

6. The system of claim 1 wherein the plurality of wired/wireless networks include:

a wired network comprising a local area network; and a wireless network comprising cellular data communications network.

7. The system of claim 1 further including a server in communication with the mobile client over the plurality of wired/wireless networks.

8. The system of claim 1 wherein the mobile client is a laptop computer.

9. A method for software application originated data message routing over a selected one of a plurality of transmission networks, the method comprising the steps of:

receiving the software application originated data message, the data message including a software application specified rule governing transmission of that message;

identifying from the specified rule a certain one of a plurality of predetermined business rules, each one of the plurality of predetermined business rules being associated with a plurality of network clauses, wherein each network clause is associated with one of the plurality of transmission networks and defines criteria for selecting that transmission network for data message communication;

evaluating the criteria for each network clause associated with the identified certain predetermined business rule to identify one network clause whose criteria is satisfiable in the context of data message transmission; and initiating transmission of the received data message over the transmission network that is associated with the identified network clause whose criteria is satisfied.

10. The method of claim 9, wherein the data message includes the specified rule and also network selection information for that data message, and wherein the step of evaluating comprises the step of:

evaluating the criteria of each network clause against the message network selection information to identify the network clause whose criteria can be met by the network selection information for the data message.

11. The method of claim 9, wherein the step of identifying comprises the steps of:

receiving with the message a logical name of a rule to be applied to the network selection for that data message; and mapping the logical name to a physical business rule.

12. The method of claim 9, further comprising the step of:

storing the received data message; and wherein the step of initiating transmission of the message is delayed pending selection of the transmission network.

* * * * *

UNITED STATES PATENT AND TRADEMARK OFFICE
CERTIFICATE OF CORRECTION

PATENT NO.    : 6,522,884 B2
DATED         : February 18, 2003
INVENTOR(S)   : Tennison et al.

It is certified that error appears in the above-identified patent and that said Letters Patent is hereby corrected as shown below:

Column 6,
Line 8, replace "like) The network" with -- "like). The network --

Column 10,
Lines 45-46, replace "clauses wherein" with -- clauses, wherein --

Column 11,
Line 20, replace "comprising cellular" should be -- comprising a cellular --

Signed and Sealed this

Twenty-sixth Day of August, 2003

JAMES E. ROGAN
*Director of the United States Patent and Trademark Office*